United States Patent [19]
Tanimoto et al.

[11] Patent Number: 6,038,113
[45] Date of Patent: Mar. 14, 2000

[54] SURFACE CHARACTERISTICS OF A MAGNETIC DISK AND A MAGNETIC DISK APPARATUS

[75] Inventors: Kazushi Tanimoto, Tokyo; Shigeru Hoshina, Kanagawa-ken, both of Japan

[73] Assignee: Kabushiki Kaisha Toshiba, Kawasaki, Japan

[21] Appl. No.: 09/046,654

[22] Filed: Mar. 24, 1998

[30] Foreign Application Priority Data

May 26, 1997 [JP] Japan ................................. 9-135297

[51] Int. Cl.[7] ........................................................ G11B 5/82
[52] U.S. Cl. ........................................................... 360/135
[58] Field of Search ............................................... 360/135

[56] References Cited

U.S. PATENT DOCUMENTS

| | | | |
|---|---|---|---|
| 5,768,076 | 6/1998 | Baumgart | 360/135 |
| 5,800,931 | 9/1998 | Lee | 360/135 |
| 5,824,387 | 10/1998 | Boutaghou | 360/135 |

*Primary Examiner*—A. J. Heinz
*Attorney, Agent, or Firm*—Finnegan, Henderson, Farabow, Garrett & Dunner, L.L.P.

[57] ABSTRACT

A magnetic disk for writing and reading information by a contact reading method comprises a plurality of asperities upon the surface of the disk. For extending the life of the disk by reducing wear, the plurality of asperities are fabricated such that the average radius of curvature of the plurality of asperities is greater than one thousand times the maximum height of the plurality of asperities on the surface. This ratio between the radius of curvature of the asperities and the surface relief of the asperities ensures a smooth surface and an extended wear life for the magnetic disk.

17 Claims, 4 Drawing Sheets

SURFACE CHARACTERISTICS OF A MAGNETIC DISK AND A MAGNETIC DISK APPARATUS

FIELD OF THE INVENTION

The present invention relates to a magnetic disk and a magnetic disk apparatus to write and read information by contact reading method.

BACKGROUND OF THE INVENTION

As well-known, the magnetic disk apparatus is widely used as an external memory apparatus of a computer. As for a kind of the magnetic disk apparatus, a head-flying method and a head-contact method are used. In the head-flying method, the head is flown on a rotated magnetic disk to write and read information. In the head-contact method, the head is compulsorily contacted on the rotated magnetic disk to write and read information. In this case, a spacing between the head and the surface of the magnetic disk is reduced in comparison with the head-flying method. Therefore, in the head-contact method, recording density of the information greatly rises.

However, in the magnetic disk apparatus of the head-contact method, the head always contacts and slides on the surface of the magnetic disk. As a result, it is difficult to avoid the wear of the head and the disk. Therefore, in the head-contact method, in order to maintain the reliability, a method for reducing the wear is necessary. This is especially important where the contact area of the head is much smaller than the area of the magnetic disk surface. Therefore, the wear of the head is much larger than that of the disk. Accordingly, an effective means to reduce the wear of the head is desired.

In short, in the magnetic disk apparatus of the head-contact method, the problem of reducing the wear of the head remains.

SUMMARY OF THE INVENTION

It is an object of the present invention to provide the magnetic disk and the magnetic disk apparatus to greatly suppress the wear of the head in case of the head-contact method.

According to the present invention, there is provided a magnetic disk with a plurality of asperities on a surface, characterized by: an average radius of curvature of each asperity peak is larger than one thousand times of a maximum height of the plurality of asperities on the surface.

Further in accordance with the present invention, there is also provided a magnetic disk apparatus comprising a magnetic disk and a head which writes and reads information for the magnetic disk by contacting the head on a surface of the magnetic disk, the magnetic disk including a plurality of asperities on the surface, characterized by: an average radius of curvature of each asperity peak is larger than one thousand times of a maximum height of the plurality of asperities on the surface.

DETAILED DESCRIPTION OF THE PREFERRED EMBODIMENTS

Figure 1:
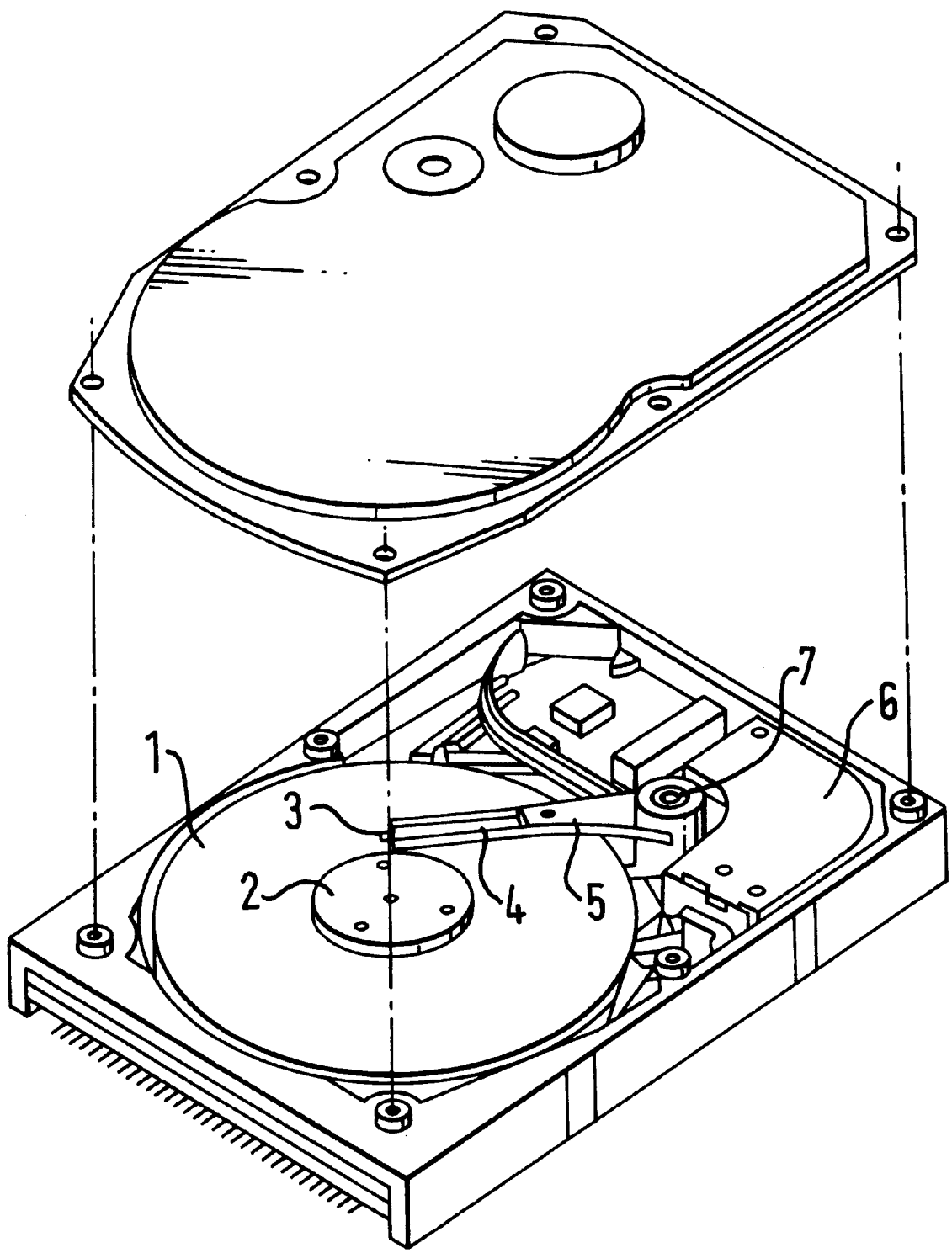
FIG. 1 is a schematic diagram of the magnetic disk apparatus according to the present invention.

FIG. 1 is a schematic diagram of the magnetic disk apparatus according to the present invention. In this magnetic disk apparatus, a rotary actuator is employed. In FIG. 1, the magnetic disk 1 as an information recording medium is installed to a spindle 2 and rotated at a predetermined rotational speed. A head slider 3 includes a magnetic transducer. The magnetic transducer writes and reads the information on the magnetic disk 1 while the magnetic transducer contacts the surface of the magnetic disk 1 with contact force below 0.001 N. The head slider 3 is attached with a gimbal not shown in FIG. 1 to the free end of a suspension 4 having the shape of a thin plate. The suspension 4 is connected to one end of the actuator arm 5. The actuator arm 5 includes a bobbin part to hold the driving coil not shown in FIG. 1.

A voice coil motor 6 as one kind of a linear motor is set to the other end of the actuator arm 5. The voice coil motor 6 comprises a driving coil and a magnetic circuit. The magnetic circuit comprises a permanent magnet and a yoke. The actuator arm 5 is supported on a fixed shaft 7 by two ball bearings not shown in FIG. 1. The two ball bearings are respectively set to an upper part and a lower part of a fixed shaft 7. The actuator arm 5 is freely turned by the voice coil motor 6.

Figure 2:
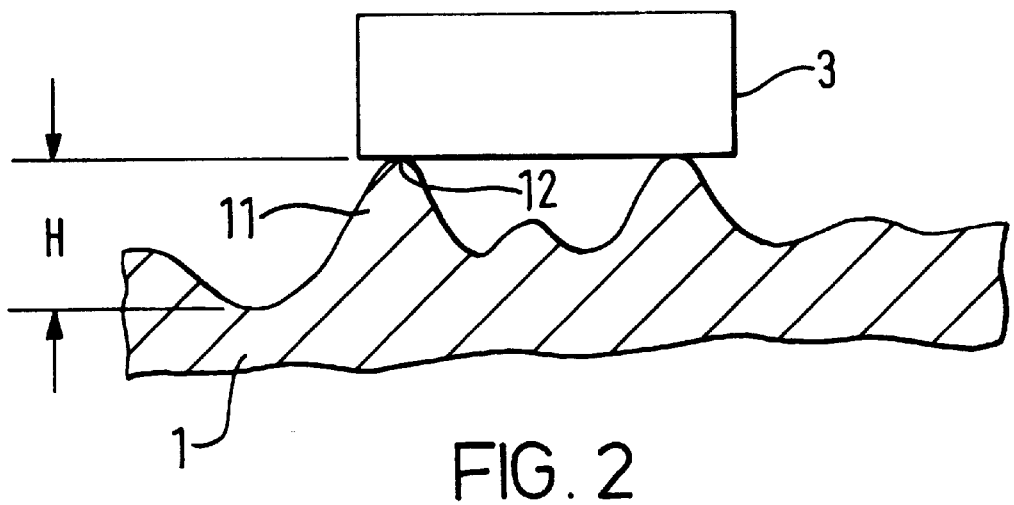
FIG. 2 is a schematic diagram showing a maximum height (H) of the asperity of the magnetic disk.
Figure 3:
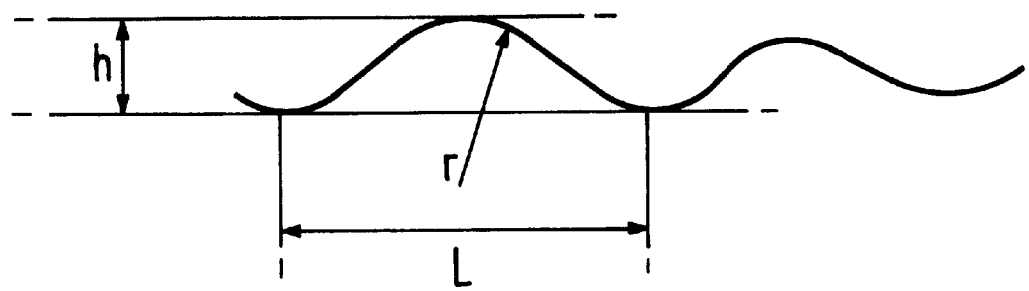
FIG. 3 is a schematic diagram showing an average radius (r) of curvature of asperity peak of the magnetic disk.

In this place, as for condition of the surface of the magnetic disk 1, a plurality of asperities exist on surface of the magnetic disk 1. FIG. 2 is a sectional plan of the magnetic disk 1 showing a maximum height (H) of the asperity. As shown in FIG. 2, the maximum height (H) is a difference between the highest asperity peak and the lowest asperity valley along a vertical direction for the surface of the magnetic disk 1. FIG. 3 is a sectional plan of the magnetic disk 1 showing a radius (r) of curvature of the asperity. In the present invention, the radius (r) of curvature of the plurality of asperities included in a predetermined area of the surface is respectively calculated as shown in FIG. 3. An average radius of the curvature of the plurality of asperities is calculated by using the radius of each asperity.

A specific feature of the present invention is that the average radius of curvature of each the plurality of asperities is larger than one thousand times the maximum height of the asperity. Conversely saying, the surface of the magnetic disk is formed such that the average radius of curvature of the plurality of asperities is larger than one thousand times the maximum height of the asperity.

In addition to this, as a preferred condition of the magnetic disk 1, the maximum height (H) is below 10 nm and the number of asperities 11 included in 1 $\mu$m×1 $\mu$m area is above 20. In the above-mentioned construction, the wear of the head 3 is reduced and the reliability of the magnetic disk apparatus is improved.

Next, a wear test of the head to determine the above condition is explained in detail. This test was already executed by the inventors. The force between the head to the disk for contact recording was assumed to be below 0.001 N and the force was set to be below 0.001 N in the test. The maximum height (H) and the average radius (r) of curvature for the plurality of asperities in the predetermined square are respectively regarded as a parameter. In this situation, the wear test to slide the head on the magnetic disk is executed for a predetermined time (for example, several hundreds hours). After the wear test is executed, a quantity of the wear of the head is measured. According to the test result, the wear depth of the head for a life time of the magnetic disk apparatus (in general, several years) is calculated and examined whether it is larger or smaller than a fatal depth (for example, 10 nm), with which the head performance is affected. If the wear depth is smaller than the fatal depth, this group of magnetic disk is regarded as a passed one. If the wear depth is equal to or larger than the fatal depth, this kind of the magnetic disk is regarded as a rejected one. Plural executions of the wear test can be performed for each group of magnetic disks. As a result, if the wear depth of some one of the same group is smaller than the fatal depth and the wear depth of the other one of the same group is not smaller than the fatal depth, this group of the magnetic disks is regarded as an almost passed one.

In above-mentioned endurance test, the maximum height (H) of the asperity is measured by AMF (Atomic Force Microscopy). In short, a measurement area on the surface of the magnetic disk is determined as 5 μm to 10 μm square. As for the plurality of asperities included in the measurement area, as shown in FIG. 2, a difference between the highest peak and the lowest valley of the asperity is determined as the maximum height (H).

Figure 4:
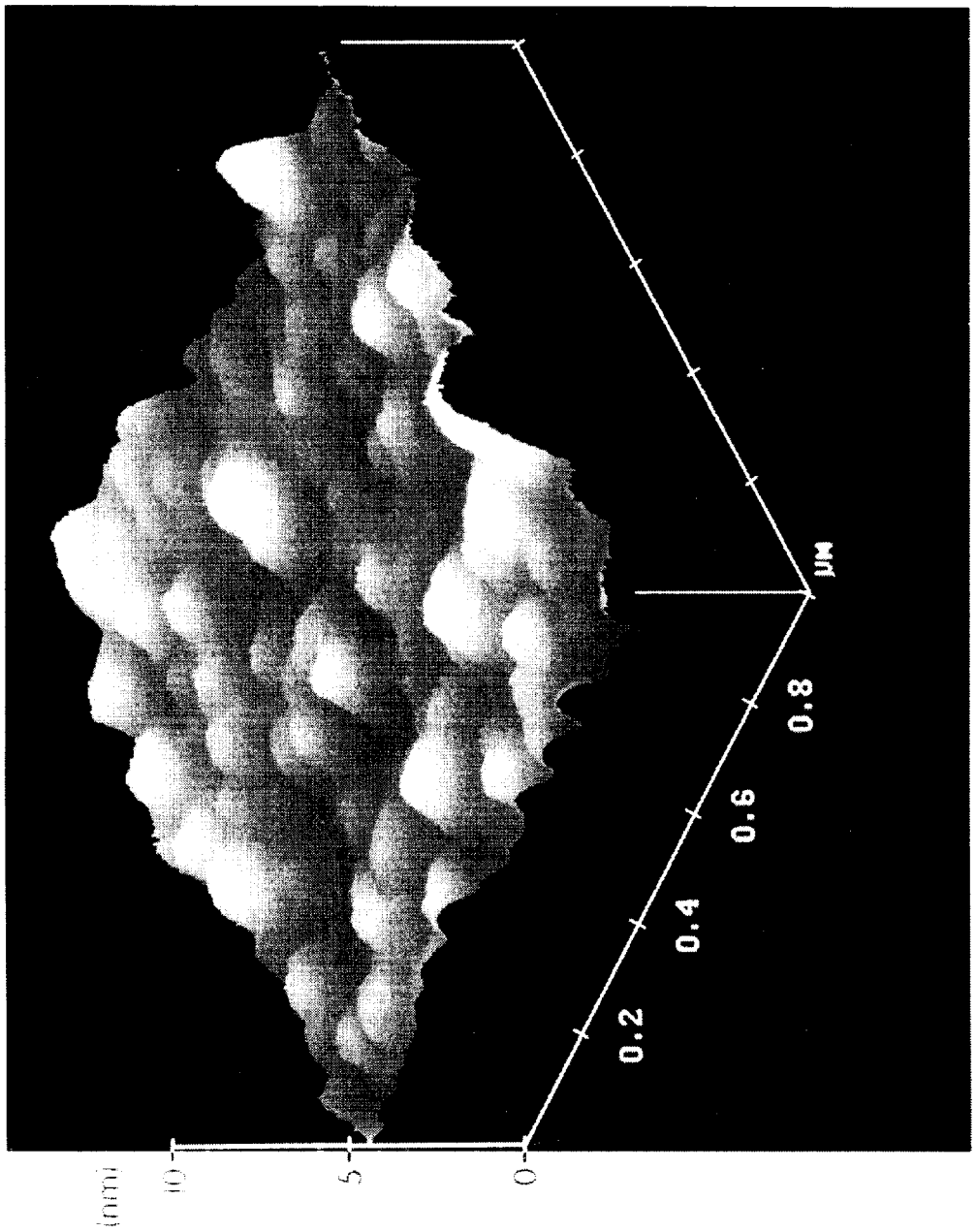
FIG. 4 is a schematic diagram of magnification showing a plurality of asperities on the predetermined square of the surface of the magnetic disk.

FIG. 4 shows a 3-D view of the disk surface with a plurality of asperities in a 1 μm×1 μm square measured by AMF. As for each asperity in this square, a section including one peak of the asperity is extracted. As shown in FIG. 3, a height (h) and a width (L) of each asperity is measured. The radius (r) of curvature of i-th asperity in the square is calculated as follows.

$$ri=(Li/2)^2/2hi$$

By using the radius (ri) of each asperity, the average radius (r̄) of curvature of all asperities in the square is calculated as follows.

$$\bar{r} = \sum_{i=1}^{N} ri/N \quad (N:\ \text{number of the asperity in the square})$$

Figure 5:
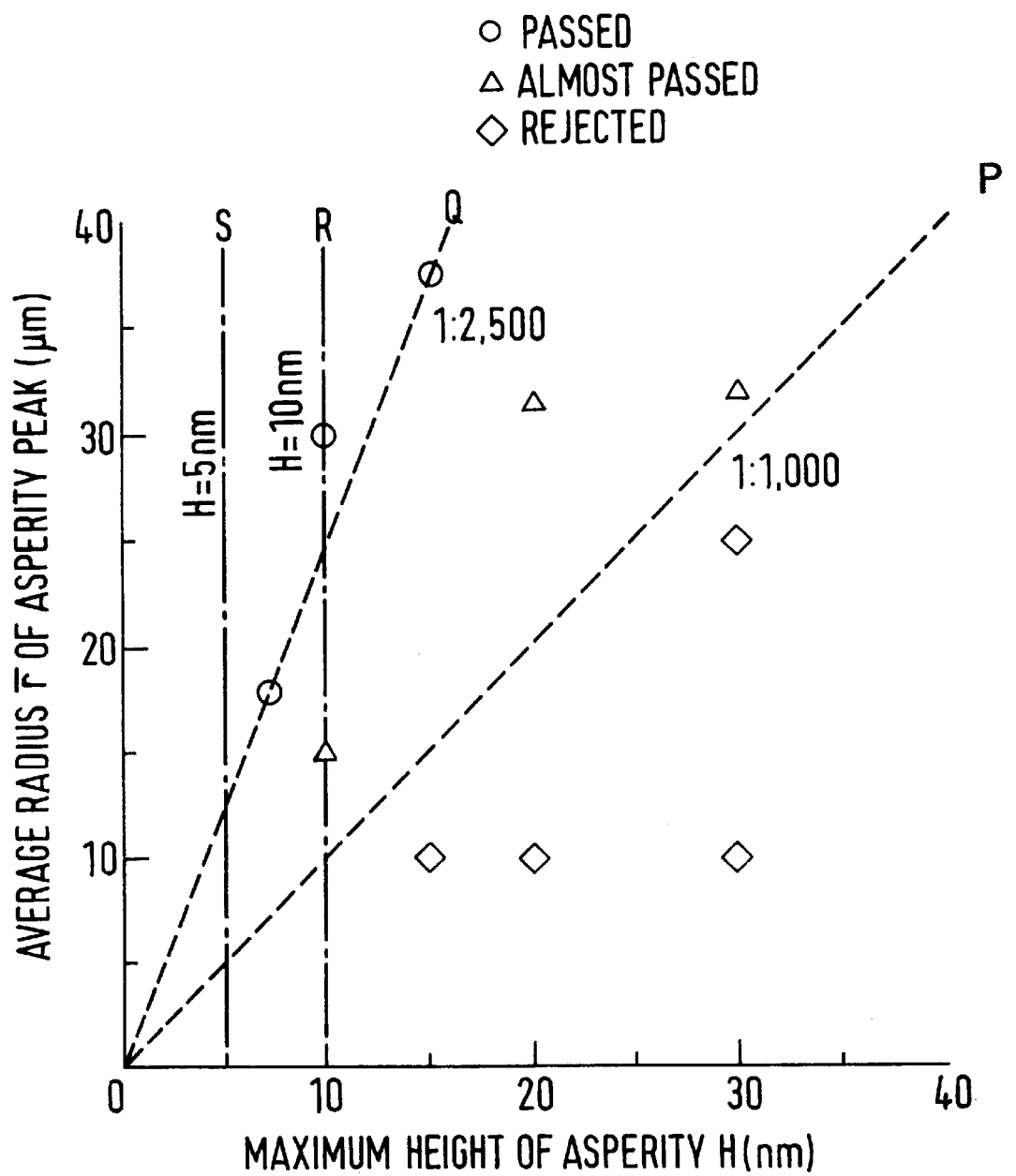
FIG. 5 is a graph showing the result of a durability test of the head according to the present invention.

FIG. 5 shows a result of the above-mentioned wear test. As shown in FIG. 5, the as passed magnetic disks and the almost passed are distributed in an area above a broken line P. This area represents that the average radius (r̄) of curvature of the asperity 11 is larger than one thousand times of the maximum height (H) of the asperity. Therefore, the surface shape of the magnetic disk suitable for the contact recording is represented as this relation between the average radius (r̄) and the maximum height (H).

Furthermore, as shown in FIG. 5. Only the as-passed magnetic disks are distributed in an area above a broken line Q. This area represents that the average radius (r̄) of curvature of the asperity 11 is larger than twenty-five hundred times of the maximum height (H) of the asperity. Therefore, the surface shape of the magnetic disk more suitable for the contact recording is represented as this relation between the average radius (r̄) and the maximum height (H).

A distance between the head and the magnetic disk depends on the maximum height (H) of the asperity 11. In the contact recording, the distance is desired to be small. In this place, the distance between the head and the magnetic disk is almost equal to the maximum height (H). In general, in the contact recording, the neighboring distance between the head and the magnetic disk is suitably decided to be below 10 nm (E, Grochowski et al., "IEEE TRANSACTION MAGNETICS, VOL. 30, No. 6, November 1994, pp.3797~3799). From this view-point, the maximum height (H) of the asperity is desired to be below 10 nm (in a left area of a chain line R in FIG. 5). Furthermore, in order to raise the recording density, the maximum height (H) of the asperity is more desired to be below 5 nm (in a left area of a chain line S in FIG. 5).

As mentioned-above, in the magnetic disk and the magnetic disk apparatus of the present invention, the wear of the head is greatly reduced even if the head contacts and slides on the surface of the magnetic disk for a long time.

Other embodiments of the invention will be apparent to those skilled in the art from consideration of the specification and practice of the invention disclosed herein. It is intended that the specification and examples be considered as exemplary only, with the true scope and spirit of the invention being indicated by the following

What is claimed is:

1. A magnetic disk with a plurality of asperities on a surface, wherein:

each asperity exhibits a peak having a height defined as a vertical distance between the peak and a corresponding valley on the surface, a width defined as a horizontal distance between two valleys on the surface, and a radius of curvature calculated from a ratio of the height and the width;

a maximum height is defined as a vertical distance between the highest peak and the lowest valley of the plurality of asperities;

an average radius of curvature is defined as an average of each radius of curvature of the plurality of asperities; and said average radius of curvature is larger than 1000 times said maximum height.

2. The magnetic disk according to claim 1, wherein the maximum height is below 10 nm.

3. The magnetic disk according to claim 1, wherein the maximum height is below 5 nm.

4. The magnetic disk according to claim 1, wherein the average radius of curvature is larger than 2500 times said maximum height.

5. The magnetic disk according to claim 4, wherein the maximum height is below 10 nm.

6. The magnetic disk according to claim 4, wherein the maximum height is below 5 nm.

7. The magnetic disk according to claim 1, wherein the radius of curvature of the peak of each asperity is calculated by an equation $r_i=(L_i/2)^2/2h_i$, where $r_i$ is the radius of curvature, $L_i$ is the width, and $h_i$ is the height.

8. The magnetic disk according to claim 1, wherein the maximum height is calculated by the highest peak and the lowest valley among asperities included in a predetermined square of the surface, and the average radius of curvature is calculated by each radius of curvature of the asperities included in the predetermined square of the surface.

9. A magnetic disk apparatus comprising a magnetic disk and a head which writes and reads information for the magnetic disk by contacting the head on a surface of the magnetic disk, the magnetic disk including a plurality of asperities on the surface, wherein:

each asperity exhibits a peak having a height defined as a vertical distance between the peak and a corresponding valley on the surface, a width defined as a horizontal distance between two valleys on the surface, and a radius of curvature calculated from a ratio of the height and the width;

a maximum height is defined as a vertical distance between the highest peak and the lowest valley of the plurality of asperities;

an average radius of curvature is defined as an average of each radius of curvature of the plurality of asperities; and said average radius of curvature is larger than 1000 times said maximum height.

10. The magnetic disk apparatus according to claim 9, wherein the head contacts on the surface of the magnetic disk by a contact force below 0.001 N.

11. The magnetic disk apparatus according to claim 9, wherein the maximum height is below 10 nm.

12. The magnetic disk apparatus according to claim 9, wherein the maximum height is below 5 nm.

13. The magnetic disk apparatus according to claim 9, wherein the average radius of curvature is larger than 2500 times said maximum height.

14. The magnetic disk apparatus according to claim 13, wherein the maximum height is below 10 nm.

15. The magnetic disk apparatus according to claim 13, wherein the maximum height is below 5 nm.

16. The magnetic disk according to claim 9, wherein the radius of curvature of the peak of each asperity is calculated by an equation $r_i=(L_i/2)^2/2h_i$, where $r_i$ is the radius of curvature, $L_i$ is the width, and $h_i$ is the height.

17. The magnetic disk according to claim 16, wherein the maximum height is calculated by the highest peak and the lowest valley among asperities included in a predetermined square of the surface, and the average radius of curvature is calculated by each radius of curvature of the asperities included in the predetermined square of the surface.

* * * * *